United States Patent [19]
Dobler et al.

[11] 3,709,649
[45] Jan. 9, 1973

[54] APPARATUS FOR MANUFACTURING FOILS OF RIGID THERMOPLASTIC MATERIAL

[75] Inventors: Johann Dobler, Unterneukirchen near Muhldorf/Inn; Leopold Hausner, Neutting Inn; Andreas Kolbe, Burgkirchen (Alz.); Hans Tittus, Wiesbaden, all of Germany

[73] Assignee: Farbwerke Hoechst Aktiengesellschaft, Frankfurt am Main, Germany

[22] Filed: March 5, 1969

[21] Appl. No.: 804,648

Related U.S. Application Data

[63] Continuation-in-part of Ser. No. 475,821, July 29, 1965, abandoned.

[30] Foreign Application Priority Data

July 29, 1964 Germany..................P 15 04 256.5

[52] U.S. Cl...................................425/363, 425/215
[51] Int. Cl. ..............................................B29d 7/14
[58] Field of Search ..18/2 C, 9, 10, 12 DR; 264/175; 425/363; 259/187, 188

[56] References Cited

UNITED STATES PATENTS

| | | | |
|---|---|---|---|
| 2,779,387 | 1/1957 | Schairer | 18/2 X |
| 3,387,322 | 6/1968 | Woellhaf | 18/2 C |

Primary Examiner—J. Spencer Overholser
Assistant Examiner—David S. Safran
Attorney—Connolly and Hutz

[57] ABSTRACT

Apparatus for manufacturing foils of rigid thermoplastic material comprises plurality of rollers forming calender system and blade having working edge located within at least terminal roller gap of calender system for removing surplus material from terminal roller gap. Removal of surplus maintains amount of material at terminal roller gap substantially constant. Baffle plate associated with working edge of blade directs removed surplus material away from terminal roller gap of calender system.

8 Claims, 8 Drawing Figures

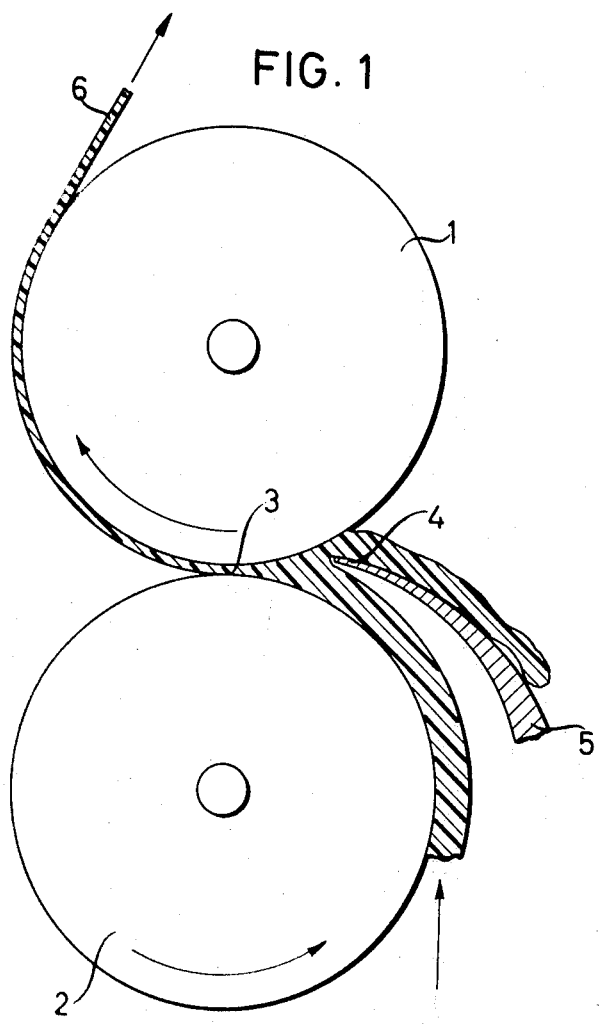
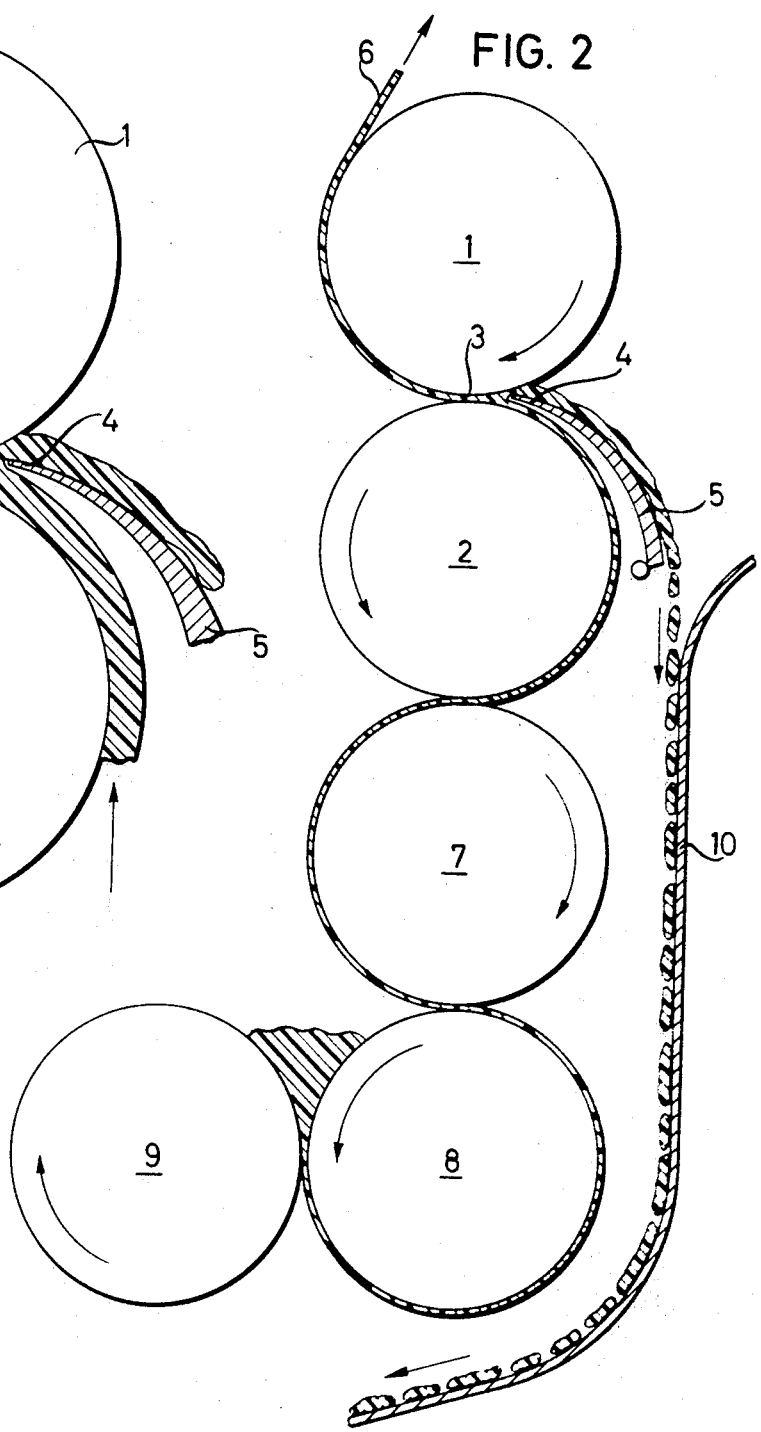

3,709,649

APPARATUS FOR MANUFACTURING FOILS OF RIGID THERMOPLASTIC MATERIAL

REFERENCE TO RELATED APPLICATION

This application is a continuation-in-part of application Ser. No. 475,821, filed July 29, 1965 now abandoned.

BACKGROUND OF THE INVENTION

The present invention relates to an apparatus for manufacturing foils of rigid thermoplastic material having improved properties.

It is known that in the manufacture of foils of thermoplastic material on calender systems the surplus kneading mass which accumulates at the entrance side of the roller gaps, especially at the entrance side of the last or terminal roller gap, impairs the quality of the foils. Owing to the accumulation of large amounts of kneading mass at the entrance side of a roller gap, the kneading mass tends to cool especially on the outer surface thereof. Such cooling causes the material to harden and this hardened material is drawn in by the calender rollers from time to time which causes numerous imperfections in the foils produced.

When the cold kneading mass is drawn between the rollers it tends to separate the rollers and thereby cause significant differences in the thickness of the foil being produced. Often, when the cold kneading mass is drawn in through a roller gap kneading streaks, striae and cracks are produced on the surface of the foil which significantly impair the surface quality of the foil. Moreover, differences in the inner structure of the foil produce different physical properties and make such a foil more difficult to print and reshape.

Attempts have been made to overcome the above disadvantages such as by heating the kneading mass which accumulates at the entrance side of the roller gaps with radiators or hot air. However, these techniques have proved totally unacceptable. Additionally, it is impossible to manually remove the surplus material with the degree of accuracy needed to produce a foil free from surface and internal defects. The economics of a manual operation also come into play.

SUMMARY OF THE INVENTION

In accordance with the present invention an apparatus is provided for manufacturing foils of rigid thermoplastic material. The apparatus comprises a plurality of rollers which cooperate with one another to form a calender system. A blade having a working edge located within at least the terminal roller gap of the calender system is arranged to remove surplus material from the terminal roller gap and thereby maintain the amount of material at that gap substantially constant. A baffle plate is associated with the working edge of the blade and this plate functions to direct the removed surplus material away from the terminal gap of the calender system.

The working edge of the blade and the baffle plate may be integral. Also, the working edge of the blade can be serrated or straight. Moreover, the working edge may be blunt or sharp. In other embodiments of this invention the blade is constructed and arranged to oscillate or rotate. In the case of a rotating blade the working edge may comprise a plurality of teeth.

BRIEF DESCRIPTION OF THE DRAWING

Novel features and advantages of the present invention in addition to those mentioned above will become apparent to one skilled in the art from a reading of the following detailed description in conjunction with the accompanying drawing wherein:

FIG. 1 is a sectional view illustrating the arrangement at the terminal roller gap of a calender system according to the present invention;

FIG. 2 is a sectional view of a calender system and arrangement for removing surplus material from the terminal roller gap of that system according to the present invention;

DETAILED DESCRIPTION OF THE INVENTION

Figure 3:
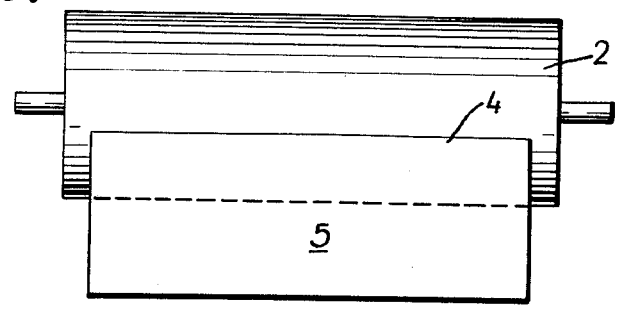
FIG. 3 is a top plan view of the rollers shown in FIG. 1 with the upper roller and thermoplastic material removed.

The generally known working method for the manufacture of foils of plastic materials on a calender has been described, for example, in "Kunststoffe" by Georg Schulz, 1959, pp.341–345, published by Carl Hanser, Munich.

By foils of rigid thermoplastic materials there are understood, according to the present invention, foils of thermoplastic materials, preferably polyvinyl chloride and/or copolymers of vinyl chloride and ethylenically unsaturated compounds, such as acrylonitrile, styrene, vinylidene chlroide, maleic acid esters, esters of acrylic acid or methacrylic acid with preferably aliphatic alcohols containing 1 to 10 carbon atoms, or foils of graft copolymers, in which vinyl chlroide is present in the grafted state, for example on an elastomeric latex, preferably on the basis of butadiene or isoprene, which materials contain no plasticizer or only as low an amount of plasticizer that in the work-up on the conventional multiple-roller calenders stationary kneading masses are formed in the calender gaps. In a particularly favorable modification, the present invention is carried out with a high surplus of thermoplastic material and at a high operational speed of the calender which, as compared with the usual calender speed, is much higher, for example by 100 percent and more. With apparatus according to the present invention, foils are obtained which, as compared to foils heretofore obtained, have a substantially improved quality owing to a greater uniformity of thickness, a smoother surface and greater homogeneity of the foil structure over the whole surface expansion. Moreover, the output per calender unit is substantially increased due to the higher calender speed applicable according to the present invention.

Referring in more particularity to the drawing, FIG. 1 illustrates the terminal rollers 1 and 2 of a calender system for producing a plastic foil 6. The thermoplastic material being rolled by the system travels to the roller gap 3 located between the terminal rollers. A blade having a working edge 4 is located within the terminal roller gap 3 at the entrance side thereof for removing surplus material which accumulates at the terminal roller gap. The blade functions to maintain the amount of material at the terminal roller gap substantially constant. A baffle plate 5 is associated with the working edge 4 of the blade for directing the removed surplus material away from the terminal roller gap 3.

As shown best in FIGS. 1 and 2 the blade comprising the working edge 4 and the baffle plate 5 is out of contact with the rollers 1 and 2 as well as the material travelling toward the entrance side of the terminal roller gap 3. As the material reaches the terminal roller gap and accumulates at that location the surplus is pushed by the incoming material upwardly over the outer surface of the blade. Ultimately, the removed surplus material is conveyed away from the terminal roller gap by the baffle plate 5 to a collecting device or tub 10. The tub 10 may be associated with other conveyor structure for feeding the removed plastic mass back into the calender system.

It is also within the confines of the present invention to provide blades comprising working edges 4 and baffle plates 5 between the roller gaps of rollers 7, 8 and 9 if the plastic material accumulates in the gaps between these rollers at an alarming rate.

Figure 5:
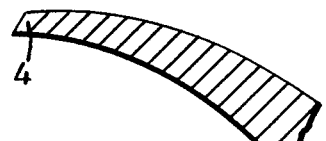
FIG. 5 is a sectional view of a blade for removing surplus material according to the present invention.
Figure 4:
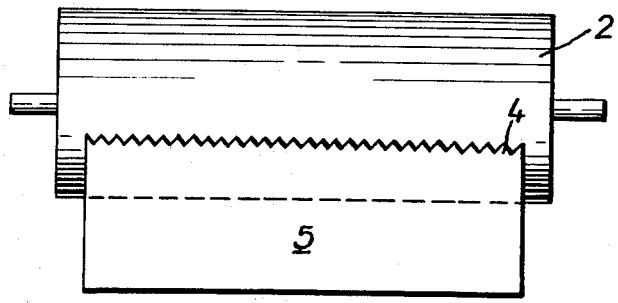
FIG. 4 is a plan view similar to FIG. 3 illustrating another embodiment of the present invention.
Figure 6:
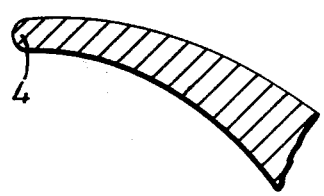
FIG. 6 is a sectional view of another blade for removing surplus material according to the present invention.

FIGS. 4, 5 and 6 illustrate various configurations for the working edge 4 of the blade, according to this invention. In FIG. 4 the working edge 4 is serrated while in FIG. 5 the working edge 4 is pointed. FIG. 6 shows a rounded working edge 4.

Figure 7:
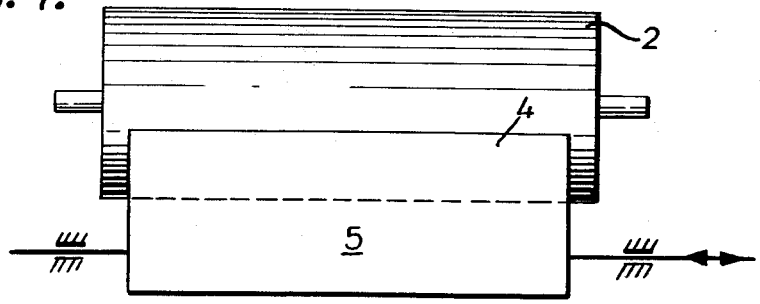
FIG. 7 is a plan view similar to FIGS. 3 and 4 illustrating still another embodiment of the present invention.

The arrangement illustrated in FIG. 7 is in many respects similar to that shown in FIG. 3 except that the blade comprising the working edge 4 and the baffle plate 5 is constructed and arranged to oscillate or reciprocate. The particular mechanism which causes the blade to oscillate is not illustrated since many known mechanisms may be utilized, such as a rotating plate which is eccentrically connected to the blade.

Figure 8:
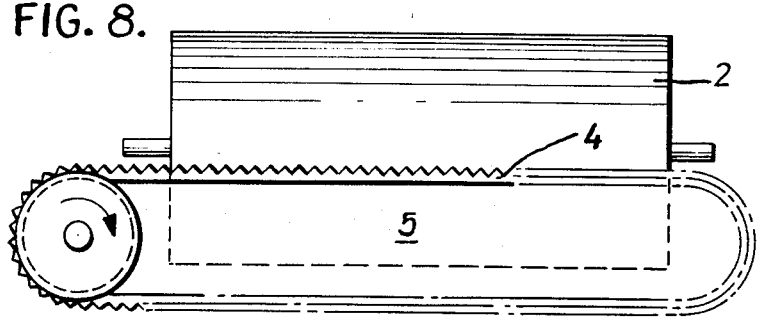
FIG. 8 is a plan view similar to FIGS. 3, 4 and 7 illustrating another embodiment of the present invention.

FIG. 8 shows a system for removing the ever-increasing mass of material which accumulates at the entrance side of a roller gap. In this embodiment of the invention the blade is constructed and arranged to rotate and the working edge 4 comprises a plurality of teeth. The baffle plate 5 is a separate element which functions to direct the removed surplus material away from the roller gap of the calender system where the blade is located. Additionally, the baffle plate 5 serves as a guide for the rotating edge 4.

What is claimed is:

1. An apparatus for manufacturing foils of rigid thermoplastic material comprising a plurality of rollers forming a calender system, a blade having a working edge located within at least the entrance side of the terminal roller gap of the calender system for removing surplus material from the entrance side of the terminal roller gap and thereby maintaining the amount of material in that gap substantially constant, and a baffle plate associated with the working edge of the blade for directing the removed surplus material away from the entrance side of the terminal roller gap of the calender system.

2. An apparatus for manufacturing foils of rigid thermoplastic material as in claim 1 wherein the working edge of the blade and the baffle plate are integral.

3. An apparatus for manufacturing foils of rigid thermoplastic material as in claim 1 wherein the working edge of the blade is serrated.

4. An apparatus for manufacturing foils of rigid thermoplastic material as in claim 1 wherein the working edge of the blade is blunt.

5. An apparatus for manufacturing foils of rigid thermoplastic material as in claim 1 wherein the working edge of the blade is sharp.

6. An apparatus for manufacturing foils of rigid thermoplastic material as in claim 1 wherein the blade is constructed and arranged to oscillate.

7. An apparatus for manufacturing foils of rigid thermoplastic material as in claim 1 wherein the blade is constructed and arranged to rotate and the working edge comprises a plurality of teeth.

8. Apparatus for the production of homogeneous, calendered thermoplastic sheeting which comprises a plurality of superposed, rotatably driven rollers with narrow gaps therebetween, means for introduction of a thermoplastic polymer composition into the gap between the lowermost roller and its next adjacent roller for kneading and forming a sheet from said composition, the resultant sheet being conveyed by said next roller and one or more rollers thereabove to a gap between the uppermost roller and the roller immediately therebelow, reciprocal blade means for continuously cutting off excess thermoplastic polymer composition being conveyed to said last mentioned gap by said last mentioned roller for removal of excess polymer composition in front of the last mentioned gap, and means for supplying the removed, excess polymer composition to said first-mentioned means.

* * * * *